(12) United States Patent
Lin

(10) Patent No.: US 12,543,904 B2
(45) Date of Patent: Feb. 10, 2026

(54) DUST COLLECTOR

(71) Applicant: Xinsen Lin, Dongying (CN)

(72) Inventor: Xinsen Lin, Dongying (CN)

( * ) Notice: Subject to any disclaimer, the term of this patent is extended or adjusted under 35 U.S.C. 154(b) by 283 days.

(21) Appl. No.: 18/298,295

(22) Filed: Apr. 10, 2023

(65) Prior Publication Data

US 2023/0240493 A1 Aug. 3, 2023

Related U.S. Application Data

(63) Continuation of application No. PCT/CN2021/126099, filed on Oct. 25, 2021.

(30) Foreign Application Priority Data

Oct. 29, 2020 (CN) .......................... 202011185061.1

(51) Int. Cl.
*A47L 9/14* (2006.01)
*A47L 9/00* (2006.01)
*A47L 9/22* (2006.01)

(52) U.S. Cl.
CPC .............. *A47L 9/14* (2013.01); *A47L 9/0027* (2013.01); *A47L 9/22* (2013.01)

(58) Field of Classification Search
CPC ............ A47L 9/14; A47L 9/0027; A47L 9/22; A47L 9/20; B01D 46/71
See application file for complete search history.

(56) References Cited

U.S. PATENT DOCUMENTS 3,901,671 A * 8/1975 Kitami ............... B01D 46/0004
55/304
5,116,395 A * 5/1992 Williams ............... B01D 46/04
96/426

(Continued)

FOREIGN PATENT DOCUMENTS

CN 2269180 Y 12/1997
CN 200991203 Y 12/2007
(Continued)

OTHER PUBLICATIONS

International search report of PCT/CN2021/126099.

*Primary Examiner* — Marc Carlson

(57) ABSTRACT

A dust collector is provided, comprising a base (1), wherein a filtering barrel (9) is installed on the upper part of the base (1), one side of the filtering barrel (9) is provided with a main fan (21), a main fan air inlet (22) extends to the inside of the filtering barrel (9) through the outer wall of the filtering barrel (9), the upper section of the filtering barrel (9) is provided with a partition plate (23) for isolating the inside of the filtering barrel (9) from top to bottom, the partition plate (23) is provided with a plurality of through holes, the main fan air inlet (22) is connected with one of the through holes, filtering devices (24) are installed in other through holes, a straight pipe (16) is installed on the upper part of the partition plate (23), the surface of the straight pipe (16) is provided with first blowback pipes (25), each of the first blowback pipes (25) faces a filtering device (24), the upper part of the straight pipe (16) is provided with a bent pipe (15), the surface of the bent pipe (15) is provided with a second blowback pipe (26), the second blowback pipe (26) passes through the partition plate (23), the upper part of the partition plate (23) is hermetically isolated, the bent pipe (15) and the straight pipe (16) are communicated with an air storage device, respectively, one side of the filtering barrel (9) is provided with an air suction port (13), the end of the air suction port (13) is provided with a third valve (131), and the lower part of the filtering barrel (9) is provided with a fourth valve (12). When the dust collector is not stopped, a dust collecting bag (304) can be replaced, which is time-saving and high in working efficiency. Using two sets of blowback systems, it is easy to clean the dust residue. Using two sets of dust collecting system, the dust collection will be (Continued)

not affected when blowing back. A hydraulic rod (8) is installed to facilitate transportation and movement.

10 Claims, 12 Drawing Sheets

(56) References Cited

U.S. PATENT DOCUMENTS

| | | | | |
|---|---|---|---|---|
| 7,517,393 B2 * | 4/2009 | Richard | ............ | B01D 46/2407 55/498 |
| 11,260,334 B2 * | 3/2022 | Suzuki | .................. | B01D 46/69 |

FOREIGN PATENT DOCUMENTS

| | | | | |
|---|---|---|---|---|
| CN | 206262261 U | | 6/2017 | |
| CN | 107411637 A | | 12/2017 | |
| CN | 206880631 U | | 1/2018 | |
| CN | 108742315 A | | 11/2018 | |
| CN | 208957979 U | * | 6/2019 | |
| CN | 209003810 U | | 6/2019 | |
| CN | 110812924 A | * | 2/2020 | ........... B01D 29/885 |
| CN | 112190178 A | | 1/2021 | |
| CN | 113662473 A | | 11/2021 | |
| CN | 111629807 B | * | 8/2022 | ........ B01J 20/28035 |
| EP | 1647319 A1 | * | 4/2006 | ............. B01D 46/71 |
| JP | H05277320 A | * | 10/1993 | |
| JP | 2016195962 A | * | 11/2016 | |
| KR | 20110133694 A | * | 12/2011 | ........... B01D 46/023 |
| KR | 101846398 B1 | | 4/2018 | |
| KR | 20200060115 A | | 5/2020 | |
| KR | 20210048894 A | * | 5/2021 | ............. B01D 46/71 |
| KR | 102360813 B1 | * | 2/2022 | ................ A47L 9/20 |
| KR | 20220018661 A | * | 2/2022 | ............. B01D 46/42 |
| KR | 20220026157 A | * | 3/2022 | ............. B01D 46/04 |

* cited by examiner

DUST COLLECTOR

TECHNICAL FIELD

The present disclosure relates to a cleaning device, in particular to a dust collector.

BACKGROUND

A dust collector uses a motor to drive blades to rotate at a high speed, which generates negative air pressure in a sealed shell and absorbs dust. The existing industrial dust collector mainly relies on a filtering bag installed in the dust collector to filter and remove dust, and the filtered air is exhausted by a vacuum pump. However, in the case of long-term use of bag-type dust removal, dust quickly accumulates in a cloth bag, causing the bag to be blocked and affecting the dust collecting effect. In order to solve this problem, there are two traditional methods, that is, manual dust vibration and pulse cleaning.

The manual dust vibration method is to vibrate the dust accumulated in the cloth bag into the dust collecting barrel. Manual dust vibration has the problems of high labor intensity, low cleaning efficiency and unsatisfactory cleaning effect.

The pulse cleaning method needs to be equipped with an air compressor when it is used, and it is completed by connecting the air pocket inside the dust collector through an air pipe. However, the air compressor is huge, so that it is difficult to move with the dust collector, which is inconvenient to use.

The above two dust removing methods both need to stop to clean, which affects the dust collection in the process of dust removal. Especially, industrial dust collectors need to work continuously.

Chinese invention patent with the authorization publication number CN105286719 B has solved the problem of cleaning the filtering device, but because a set of cleaning systems is used, the cleaning effect is not so good. The device needs to stop to clean separately. Because the dust collector body is fixed in shape and structure, the dust collector body cannot be reversed and deformed, and it is huge, which also results in the disadvantage of inconvenient movement and transportation.

SUMMARY

The purpose of the present disclosure is to provide a dust collector aiming at the defects existing in the prior art, which solves the problem in the prior art that it is inconvenient to move and transport a large dust collector, the automatic blowback cleaning of the filtering device cannot be realized, the dust collecting efficiency is low, and the dust collector needs to stop for replacing the dust collecting bag.

According to the technical scheme, a dust collector is provided, comprising a base, wherein a filtering barrel is installed on the upper part of the base, one side of the filtering barrel is provided with a main fan, the main fan is provided with a main fan air inlet and a main fan air outlet, the main fan air inlet extends to the inside of the filtering barrel through the outer wall of the filtering barrel, the upper section of the filtering barrel is provided with a partition plate capable of dividing the inner space of the filtering barrel, the inner space of the filtering barrel above the divided partition plate is an upper cavity of the filtering barrel, the inner space of the filtering barrel below the divided partition plate is the lower cavity of the filtering barrel, the partition plate is provided with a plurality of through holes, the main fan air inlet is communicated with one of the through holes hermetically, filtering devices are installed in other through holes hermetically, a straight pipe which extends to the outside of the filtering barrel is installed on the upper part of the partition plate, the surface of the straight pipe is provided with a plurality of first blowback pipes communicated with the straight pipe, each of the first blowback pipes faces a filtering device, a bent pipe extending to the outside of the filtering barrel is provided above or below the straight pipe, the surface of the bent pipe is provided with a plurality of second blowback pipes communicated with the bent pipe, the second blowback pipes extend to the lower part of the partition plate through the partition plate, the upper part of the partition plate is hermetically isolated from the outside by a sealing plate, the bent pipe is communicated with an air storage device through a first valve, the straight pipe is communicated with the air storage device through a second valve, one side of the filtering barrel is provided with an air suction port leading to the lower cavity of the filtering barrel, the end of the air suction port is provided with a third valve, the lower cavity of the filtering barrel is hermetically isolated from the outside through a fourth valve provided at the bottom of the filtering barrel, the air suction port is communicated with an auxiliary air suction pipe, a fifth valve is installed in the auxiliary air suction pipe, the fifth valve is communicated with the inside of an auxiliary filtering barrel, the auxiliary filtering barrel is communicated with an auxiliary air outlet pipe outside the auxiliary filtering barrel through the filtering device inside the auxiliary filtering barrel, the auxiliary air outlet pipe is communicated with an auxiliary fan, and the bottom of the auxiliary filtering barrel is provided with a sixth valve.

Further, the other side of the filtering barrel is provided with a blowback exhaust pipe communicated with the lower cavity of the filtering barrel, the inside of the blowback exhaust pipe is communicated with the outside through the filtering device, and the top of the blowback exhaust pipe is provided with a one-way valve.

Further, two vertical racks are provided on the upper part of the base, rotating shafts are provided on the two racks oppositely, the rotating shafts are provided with a support frame rotating around the rotating shafts, the support frame is used to fixedly install the filtering barrel, the main fan is installed on the support frame, when the filtering barrel stands upright, the surface of the rack on the radial side of the rotating shaft is provided with a first pin hole, the surface of the support frame on the radial side of the rotating shaft is provided with a second pin hole, the position of the first pin hole is opposite to that of the second pin hole, the surface of the rack on the axial side of the rotating shaft is provided with a third pin hole, the surface of the support frame is provided with a fourth pin hole, and the position of the third pin hole corresponds to that of the fourth pin hole.

Further, one end of a hydraulic rod is installed on the surface of the support frame on the radial side of the rotating shaft through a hinge, and the other end of the hydraulic rod is installed on the surface of the base through a hinge.

Further, the outlet of the fourth valve is provided vertically downward, the fourth valve is provided with a circle of grooves with downward openings around the outlet, the lower part of the filtering barrel is provided with a dust collecting barrel with upward openings, the upper edge of the dust collecting barrel is installed in the grooves, two dust collecting barrel brackets are vertically provided on the rack of the lower part of the fourth valve, and the dust collecting barrel is provided between the two dust collecting barrel brackets;

the inner side of the dust collecting barrel bracket is provided with an L-shaped groove, the L-shaped groove is open to the direction opposite to the rack, the surface of the dust collecting barrel bracket on the lower part of the L-shaped groove is provided with a bump, rotating shafts are provided on both sides of the dust collecting barrel, a handle perpendicular to the axis of the rotating shaft is fixedly provided on the rotating shaft, and a roller parallel to the axis of the rotating shaft extends from the side surface of the handle.

Further, the sealing plate and the filtering barrel are fixed by a buckle, and the sealing plate and the filtering barrel are sealed by a sealing gasket provided at the top edge of the filtering barrel.

Further, the filtering device comprises an annular hollow sleeve, a flange is provided at the periphery of the upper part of the annular hollow sleeve, the lower part of the flange of the annular hollow sleeve is installed on a columnar support frame, a filtering bag is sleeved at the periphery of the columnar support frame, and the filtering bag is inserted into the through holes on the partition plate.

Further, the annular hollow sleeve is made of sealing rubber.

Further, the air storage device comprises an air storage tank, the air storage tank is communicated with a compressor through a pipeline, and the air storage tank is connected with the first valve and the second valve.

Further, the first valve, the second valve, the third valve, the fourth valve, the fifth valve and the sixth valve are electric valves.

Further, the end of the main fan air outlet is communicated with a muffler, and the auxiliary air outlet is communicated with an auxiliary muffler.

Further, the bottom of the base is provided with a moving wheel.

Compared with the prior art, the present disclosure has the following advantages. The design is reasonable, and the action is reliable. The fourth valve is turned off, so that the dust collecting bag can be replaced without stopping the device (the dust collecting bag needs to be replaced when it is full), and the cleaning process does not affect the dust collection. Two sets of blowback systems are used, blowback can be performed on the inside and outside of the filtering device, and it is easy to clean the dust residue. Two sets of dust collection systems, namely a main fan and an auxiliary fan, are provided. The auxiliary fan works in the blowback process, and the dust collection is not affected, so that the main fan and the auxiliary fan can be seamlessly connected for collecting dust, which is time-saving and high in working efficiency. A hydraulic rod is installed, so that the filtering barrel can be conveniently rotated from the vertical direction to the horizontal direction, the height of the whole device is reduced, the transportation and movement are convenient, and the practicability is strong.

DETAILED DESCRIPTION OF THE EMBODIMENTS

Figure 1:
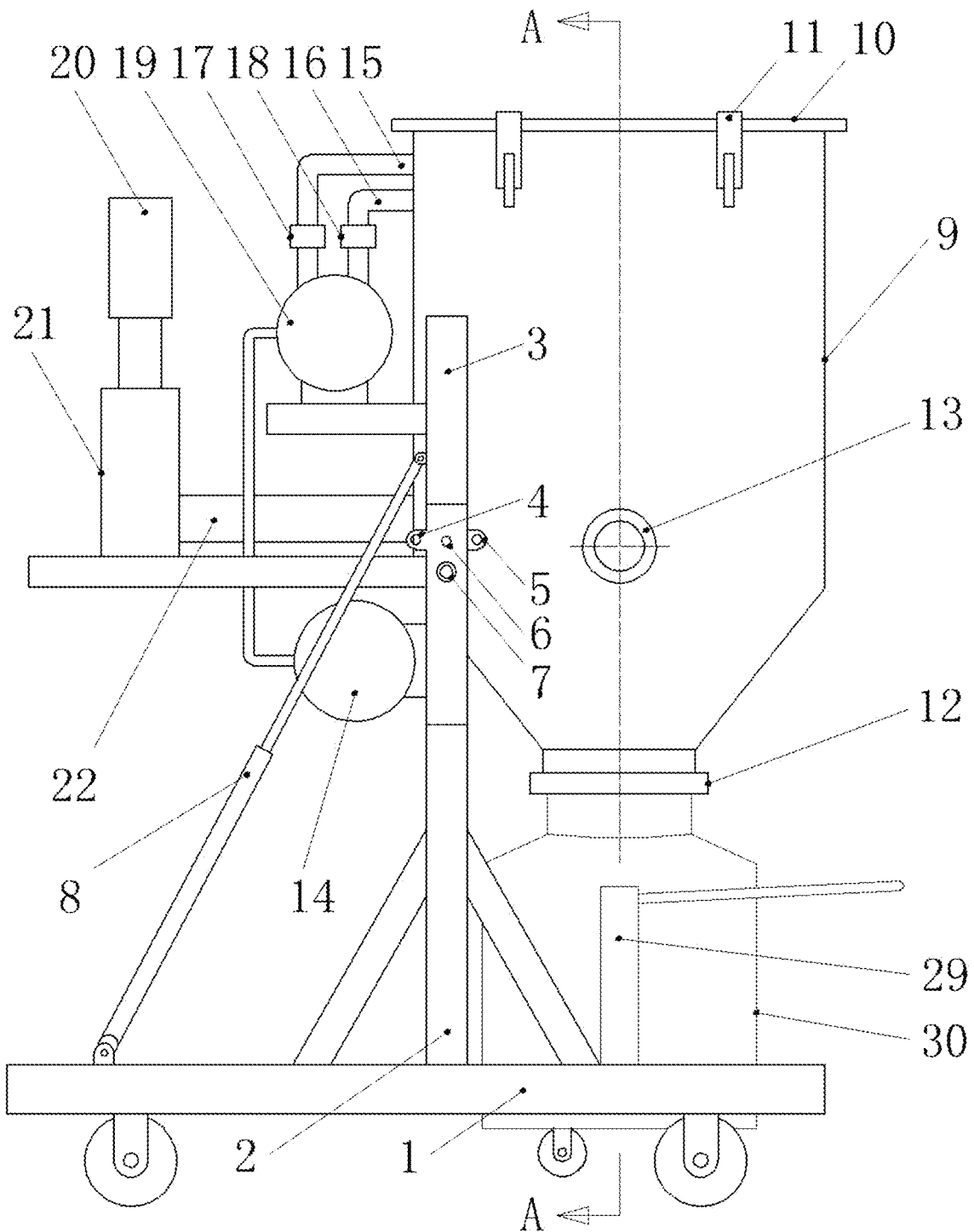
FIG. 1 is a front view of the present disclosure.

The technical scheme in the embodiment of the present disclosure will be clearly and completely described with reference to the attached drawings hereinafter. Obviously, the described embodiments are only some of the embodiments of the present disclosure, rather than all of the embodiments.

In addition, the terms "first" and "second" are only used for the purpose of description, and cannot be understood as indicating or implying relative importance or implicitly indicating the number of indicated technical features. Therefore, the features defined using "first" and "second" may include one or more of the features explicitly or implicitly. In the description of the present disclosure, "a plurality of" means two or more, unless otherwise specifically defined.

Referring to FIGS. 1-12, a dust collector comprises a base 1. A filtering barrel 9 is installed on the upper part of the base 1. One side of the filtering barrel 9 is provided with a main fan 21. The main fan 21 is provided with a main fan air inlet 22 and a main fan air outlet. The main fan air inlet 22 extends to the inside of the filtering barrel 9 through the outer wall of the filtering barrel 9. The upper section of the filtering barrel 9 is provided with a partition plate 23. The partition plate 23 is used to divide the inner space of the filtering barrel 9. An upper cavity and a lower cavity are formed in the filtering barrel 9. The cavity of the filtering barrel 9 located above the partition plate 23 is not communicated with the cavity of the filtering barrel 9 located below the partition plate 23. The inner space of the filtering barrel above the divided partition plate is an upper cavity of the filtering barrel. The inner space of the filtering barrel below the divided partition plate is the lower cavity of the filtering barrel. The partition plate 23 is provided with a plurality of through holes. The main fan air inlet 22 is communicated with one of the through holes hermetically. A filtering device 24 is installed on the edge of each of other through holes hermetically. A straight pipe 16 which extends from the inside of the filtering barrel 9 to the outside of the filtering barrel 9 is installed on the upper part of the partition plate 23. The surface of the straight pipe 16 is provided with a plurality of first blowback pipes 25 communicated with the straight pipe. Each of the first blowback pipes 25 faces a filtering device 24. A bent pipe 15 extending to the outside of the filtering barrel 9 is provided above or below the straight pipe 16. The surface of the bent pipe 15 is provided with a plurality of second blowback pipes 26 communicated with the bent pipe. The second blowback pipes 26 extend to the lower part of the partition plate 23 through the partition plate 23. A sealing plate 10 is provided above the partition plate 23. The inside of the filtering barrel 9 can be separated from the outside space of the filtering barrel 9 by the sealing plate 10, so that the inside of the filtering barrel 9 is not communicated with the outside space of the filtering barrel 9. The bent pipe 15 is communicated with an air storage device through a first valve 17. The straight pipe 16 is communicated with the air storage device through a second valve 18. The barrel wall of the filtering barrel 9 is provided with an air suction port 13. The air suction port 13 is communicated with the cavity of the filtering barrel 9 below the partition plate 23. The end of the air suction port 13 is provided with a third valve 131. The barrel wall of the filtering barrel 9 is provided with a blowback exhaust pipe 27. The blowback exhaust pipe 27 is also communicated with the cavity of the filtering barrel 9 below the partition plate 23. The inside of the blowback exhaust pipe 27 is communicated with the outside through the filtering device 24. The top of the blowback exhaust pipe 27 is provided with a one-way valve 28. The cavity of the filtering barrel 9 below the partition plate 23 is communicated with the outside through a fourth valve 12 provided at the bottom of the filtering barrel 9. The air suction port 13 is connected in parallel with the auxiliary air suction pipe 31. A fifth valve is installed in the auxiliary air suction pipe 31. The fifth valve is communicated with the inside of an auxiliary filtering barrel 33. The auxiliary filtering barrel 33 is communicated with an auxiliary air outlet pipe 35 outside the auxiliary filtering barrel 33 through the filtering device inside the auxiliary filtering barrel 33. The auxiliary air outlet pipe 35 is communicated with an auxiliary fan 36. The bottom of the auxiliary filtering barrel 33 is provided with a sixth valve 34. A blowback system is installed, so that the filtering device can be cleaned in the reverse direction without stopping the device. Moreover, the auxiliary fan 36 can be used for dust collection during the cleaning process, so that the dust collecting efficiency is high. The first blowback pipe 25 and the second blowback pipe 26 are used, that is, two sets of blowback systems are used, so that the inside and outside of the filtering device 24 in the filtering barrel 9 can be subjected to blowback, and it is easy to clean the dust residue.

Two vertical racks 2 are provided on the upper part of the base 1. A rotating shaft 7 is provided on each of the two racks 2. The rotating shaft 7 is provided with a support frame 3 rotating around the rotating shafts. The support frame 3 is used to fixedly install the filtering barrel 9. The main fan 21 is installed on the support frame 3. When the filtering barrel 9 stands upright, the surface of the rack 2 on the radial side of the rotating shaft 7 is provided with a first pin hole 4. The surface of the support frame 3 on the radial side of the rotating shaft 7 is provided with a second pin hole 5. The position of the first pin hole 4 is opposite to that of the second pin hole 5. The surface of the rack 2 on the axial side of the rotating shaft 7 is provided with a third pin hole 6. The surface of the support frame 3 is provided with a fourth pin hole corresponding to the third pin hole. The first pin hole 4 and the second pin hole 5 are provided. When the filtering barrel 9 is placed vertically, pins are inserted into the first pin hole 4 and the second pin hole 5 at the same time to fix the vertical placement state of the filtering barrel 9. The third pin hole 6 and the fourth pin hole are provided. When the filtering barrel 9 is placed horizontally, pins are inserted into the third pin hole 6 and the fourth pin hole at the same time to fix the horizontal placement state of the filtering barrel 9. The rotating shaft 7 is provided, which facilitates the rotation of the filtering barrel 9 from the vertical state to the horizontal state, reduces the height of the whole device and facilitates transportation and movement.

The surface of the support frame 3 on the radial side of the rotating shaft 7 is connected with one end of a hydraulic rod 8 through a hinge, and the other end of the hydraulic rod 8 is installed on the surface of the base 1 through a hinge. Through the telescopic movement of a movable rod of the hydraulic rod 8, the vertical placement state and the horizontal placement state of the filtering barrel 9 can be easily switched.

Figure 2:
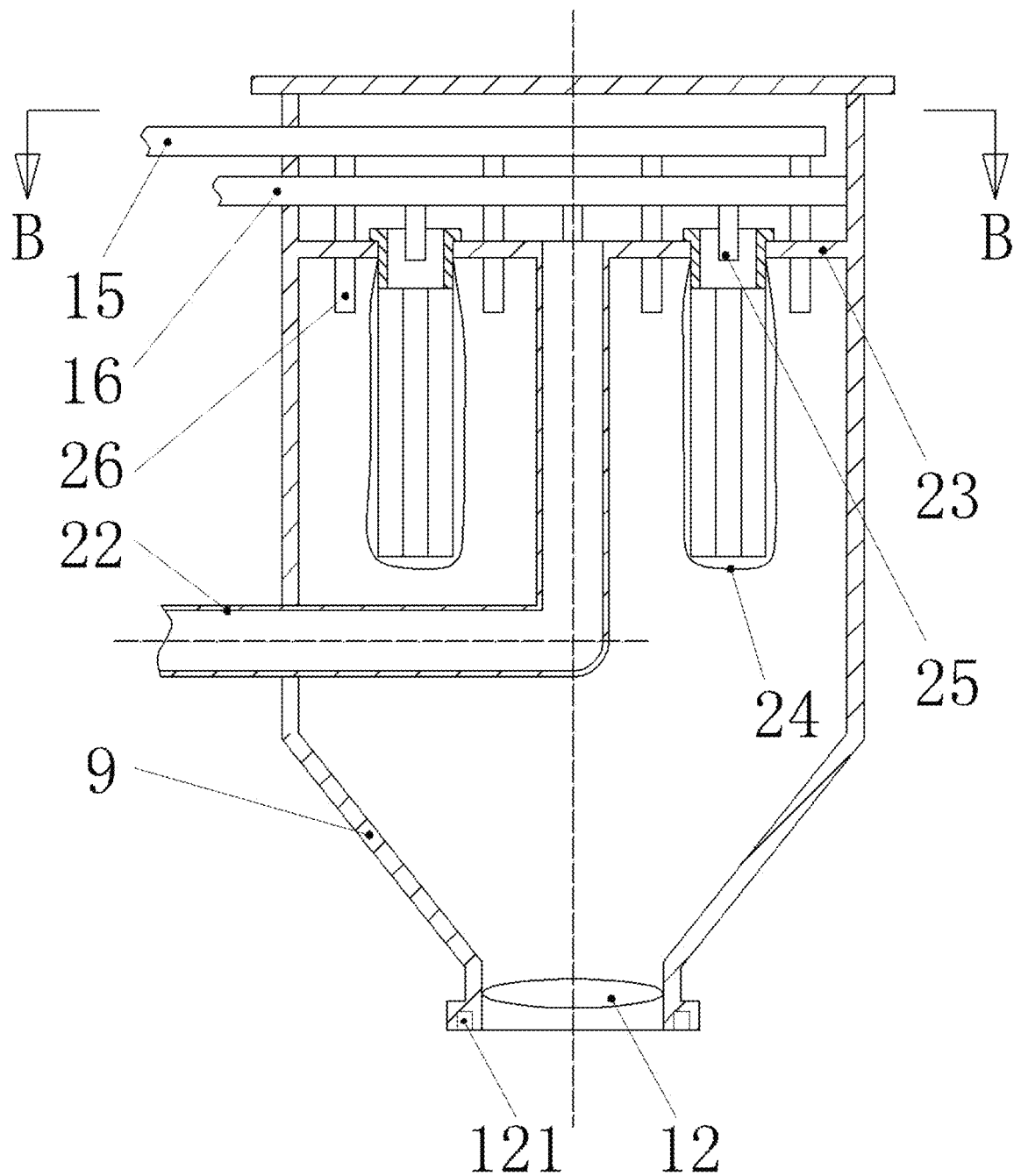
FIG. 2 is a right cross-sectional view of a filtering barrel of FIG. 1 according to the present disclosure.
Figure 3:
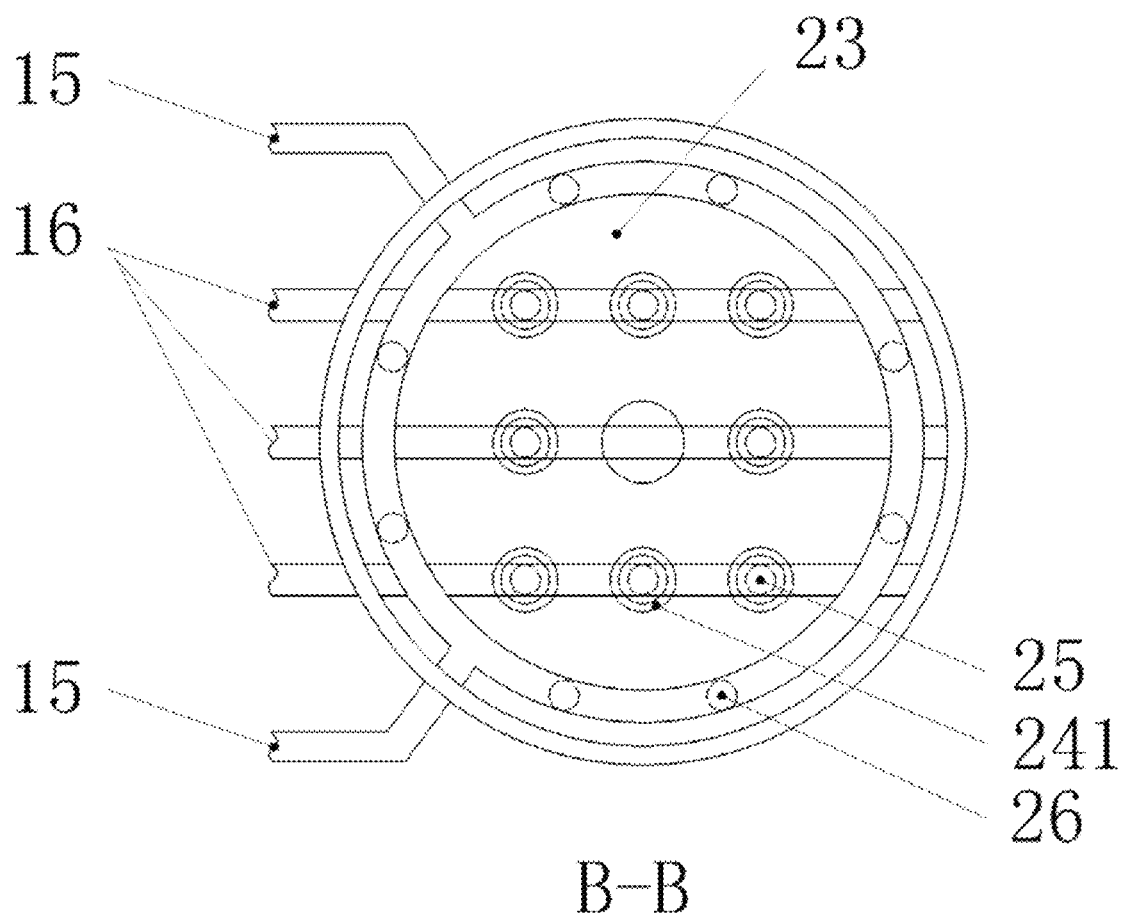
FIG. 3 is a view in the B-B direction of FIG. 2 of the present disclosure.
Figure 4:
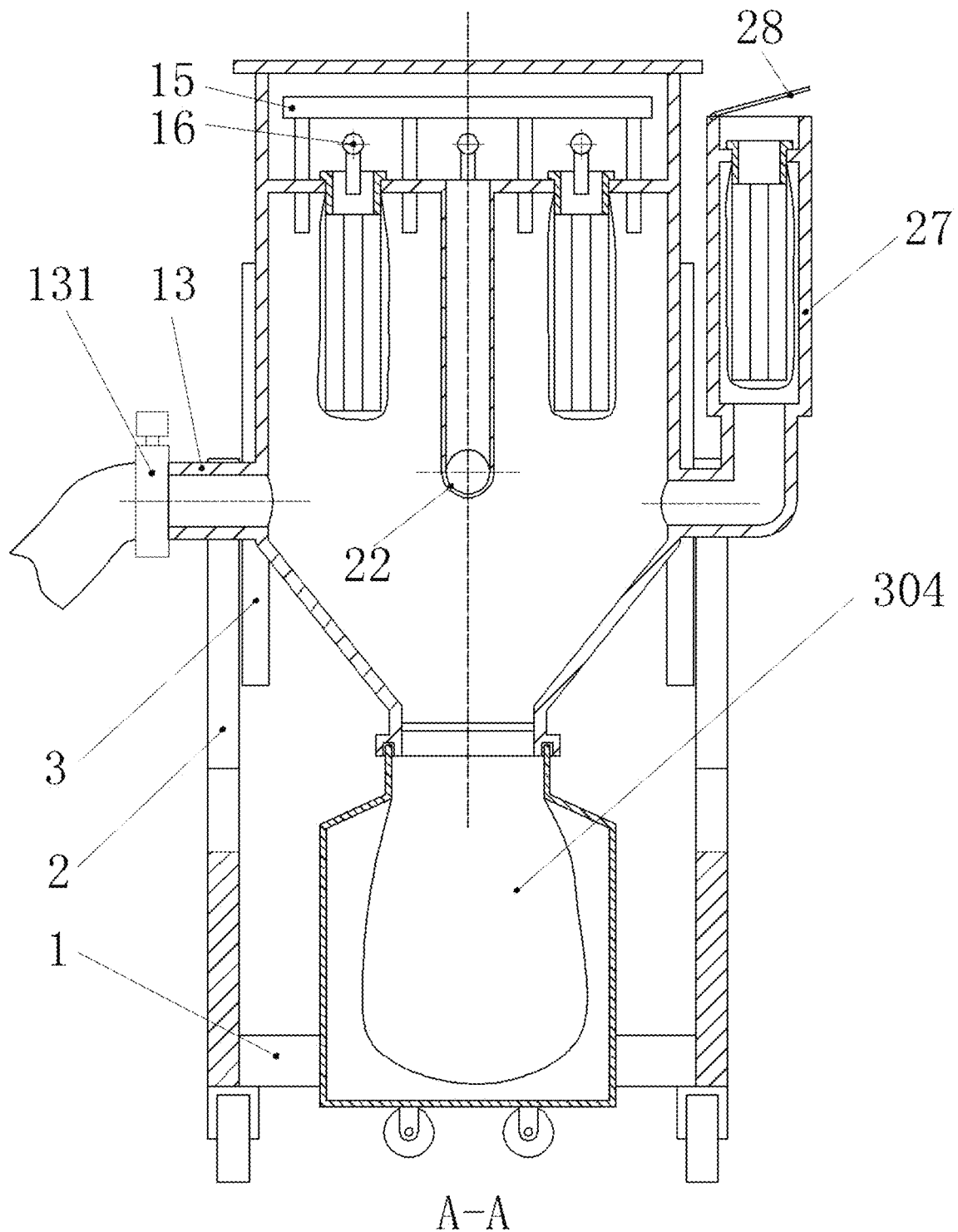
FIG. 4 is a view in the A-A direction of FIG. 1 of the present disclosure.
Figure 5:
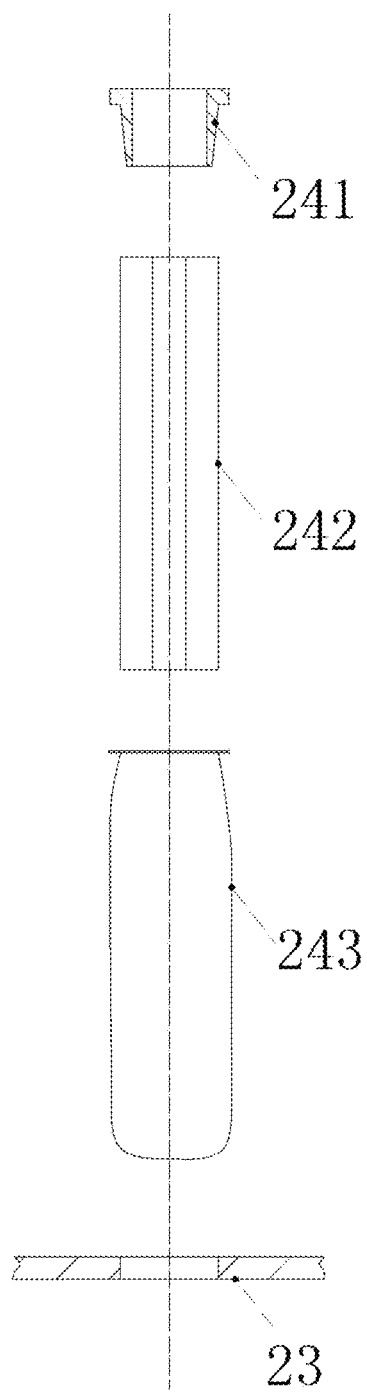
FIG. 5 is an exploded view of a component of a filtering device according to the present disclosure.
Figure 6:
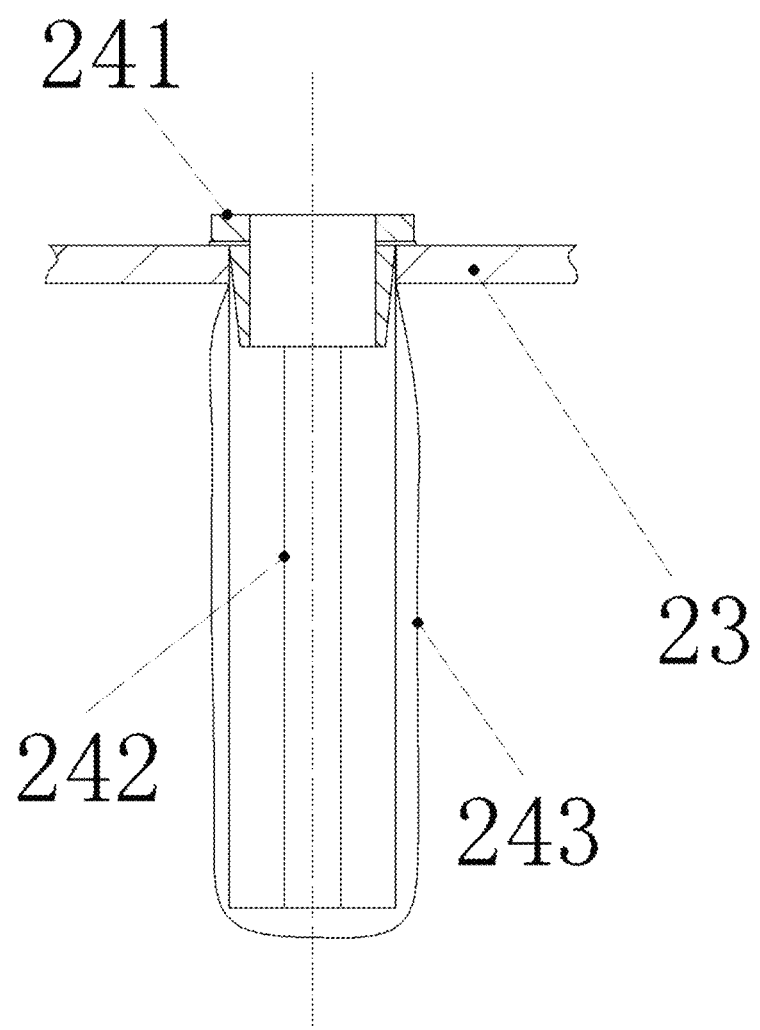
FIG. 6 is an assembled view of a component of a filtering device according to the present disclosure.
Figure 7:
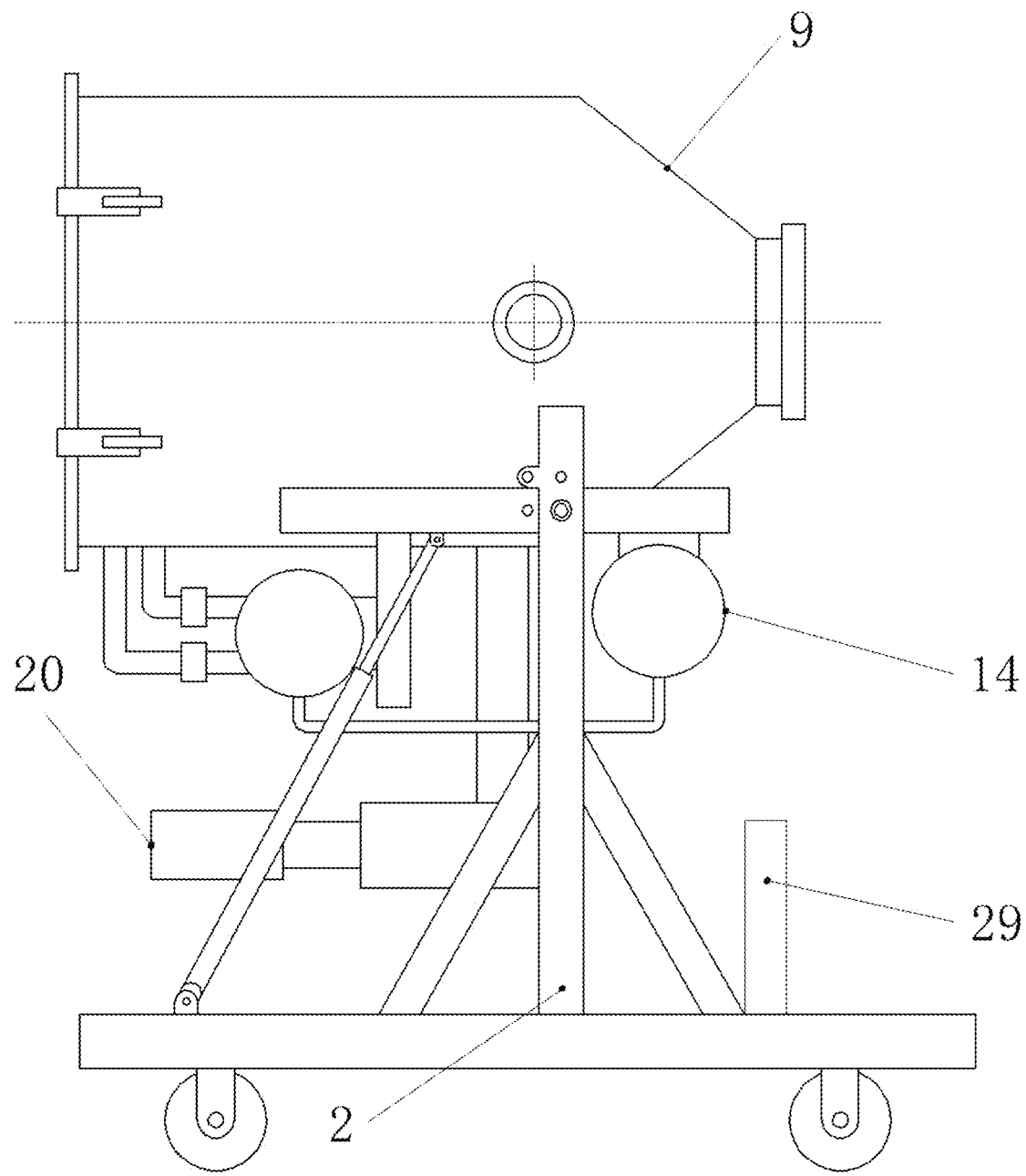
FIG. 7 is a view of a filtering barrel rotating 90 degrees counterclockwise according to the present disclosure.
Figure 8:
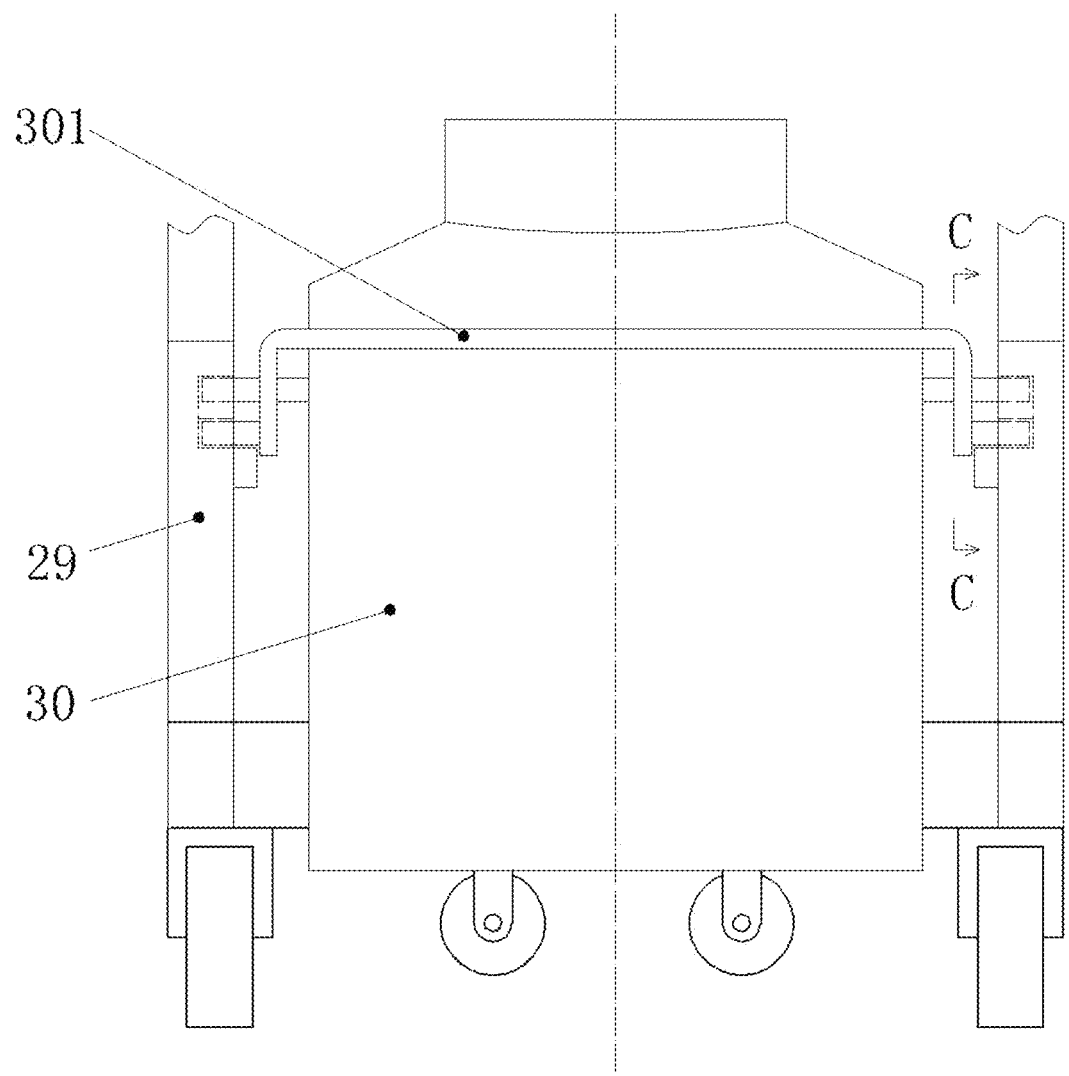
FIG. 8 is a right side view of a dust collecting barrel in FIG. 1 according to the present disclosure.
Figure 9:
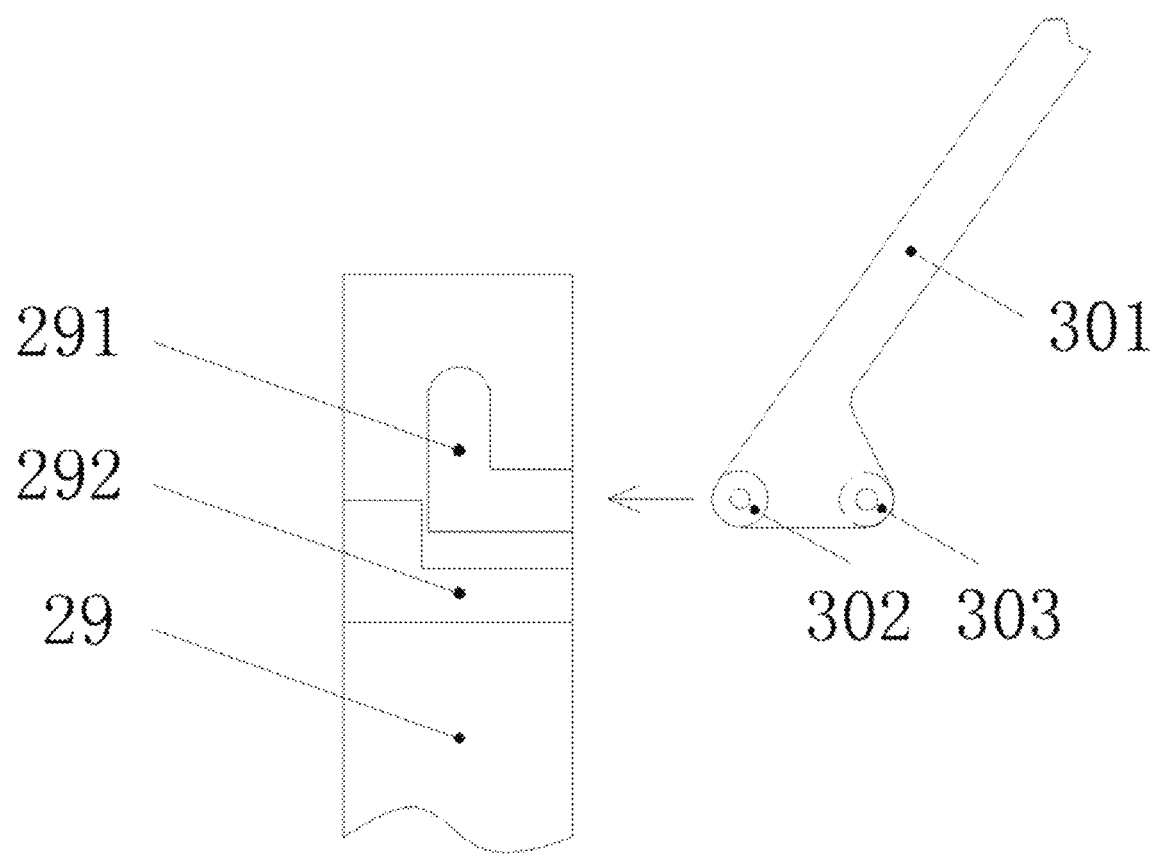
FIG. 9 is a schematic plan view of a dust collecting barrel prior to being installed on a dust collecting barrel bracket according to the present disclosure.
Figure 10:
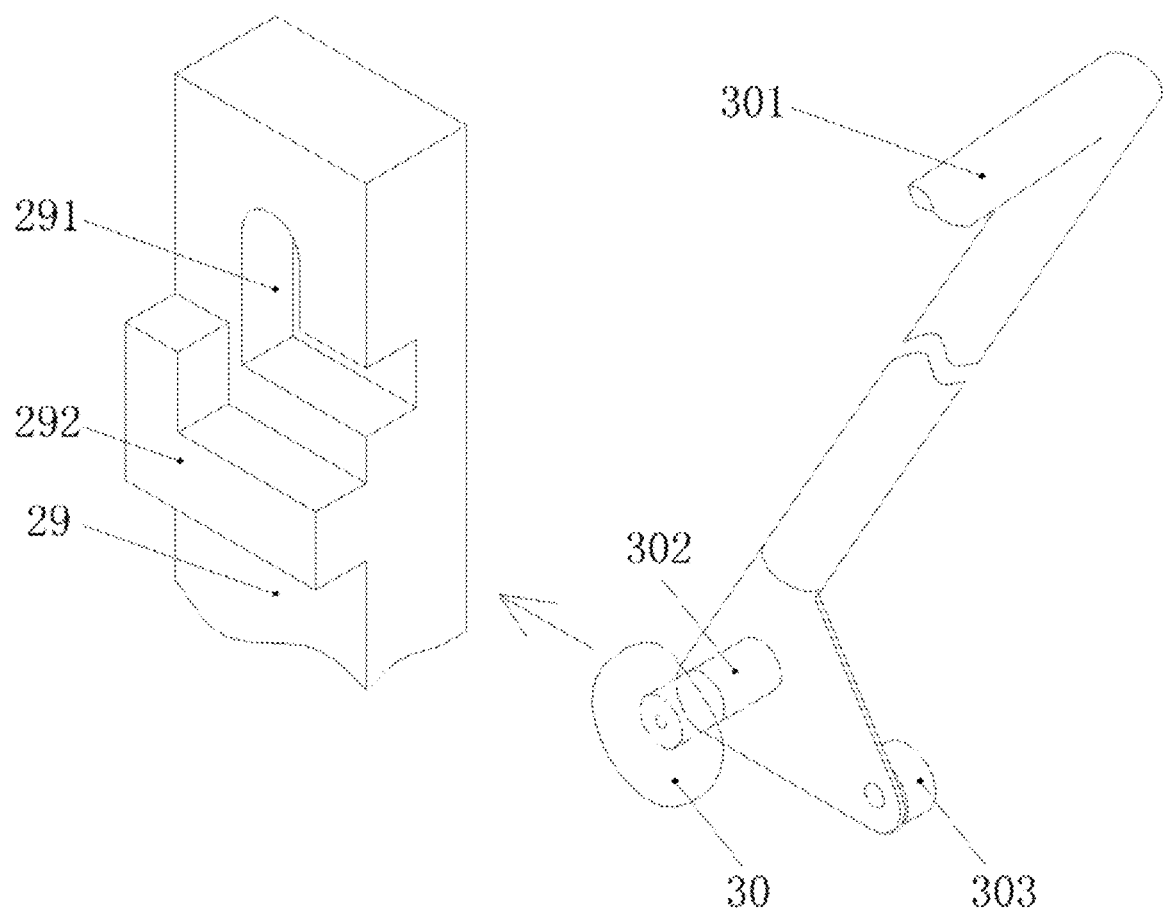
FIG. 10 is a schematic perspective view of a dust collecting barrel prior to being installed on a dust collecting barrel bracket according to the present disclosure.
Figure 11:
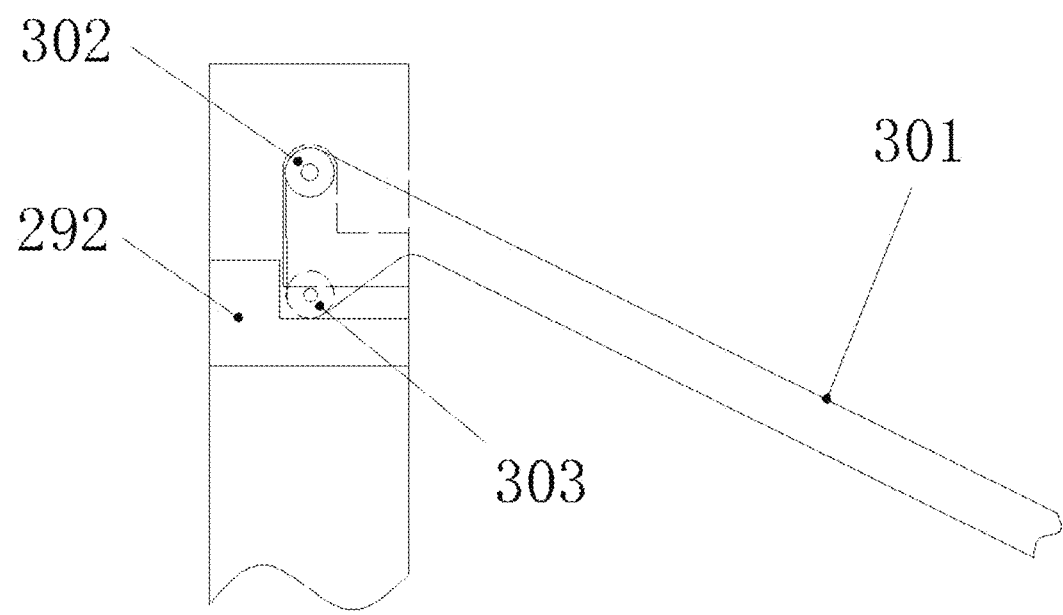
FIG. 11 is a view in the C-C direction of FIG. 8 of a dust collecting barrel installed on a dust collecting barrel bracket according to the present disclosure.
Figure 12:
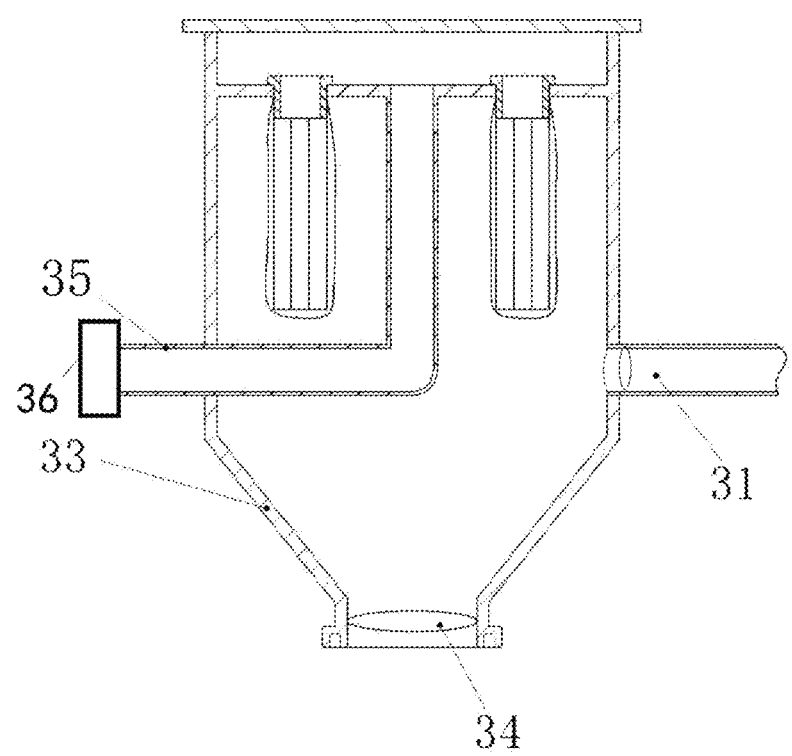
FIG. 12 is an internal cross-sectional view of an auxiliary filtering barrel according to the present disclosure.

The outlet of the fourth valve 12 is provided vertically downward. The fourth valve 12 is provided with a circle of grooves 121 with downward openings around the outlet (as shown in FIG. 2). The lower part of the filtering barrel 9 is provided with a dust collecting barrel 30 with upward openings. The upper edge of the dust collecting barrel 30 is installed in the grooves 121. The dust collecting barrel brackets 29 are vertically provided on two racks 2 of the lower part of the fourth valve 12, respectively. The dust collecting barrel 30 is provided between the two dust collecting barrel brackets 29. The dust collecting barrel 30 is used to store dust. A dust collecting bag 304 can be installed in the dust collecting barrel 30 to facilitate the dumping of dust. The dust collecting bag 304 is sleeved in the dust collecting barrel 30. The mouth of the dust collecting bag 304 is exposed from the mouth of the dust collecting barrel 30. The entrance of the dust collecting barrel 30 is closely attached to the grooves 121 through the dust collecting bag 304. An annular sealing rubber ring can be installed in the grooves 121 to prevent the dust from scattering due to the lax sealing between the dust collecting barrel 30 and the grooves 121. The dust collecting barrel bracket 29 is used to support the dust collecting barrel 30.

The inner side of the dust collecting barrel bracket 29 is provided with an L-shaped groove 291. The L-shaped groove 291 is open to the direction opposite to the rack 2. The surface of the dust collecting barrel bracket 29 on the lower part of the L-shaped groove 291 is provided with a bump 292. Rotating shafts 302 are provided on both sides of the dust collecting barrel 30. A handle 301 perpendicular to the axis of the rotating shaft 302 is fixedly provided on the rotating shaft 302. A roller 303 parallel to the axis of the rotating shaft 302 extends from the side surface of the handle 301. The overall width of the roller 303 and the rotating shaft 302 is not greater than the height from the upper surface of the bump 292 to the top of the L-shaped groove 291. The L-shaped groove 291 is provided, which can conveniently and quickly replace the dust collecting bag 304 in the dust collecting barrel 30.

The sealing plate 10 and the filtering barrel 9 are fixed by a buckle 11. The sealing plate 10 and the filtering barrel 9 are sealed by a sealing gasket provided at the top edge of the filtering barrel 9. A buckle is installed on the sealing plate, so that the sealing plate can be easily disassembled and assembled, which facilitates maintenance and inspection.

The filtering device 24 comprises an annular hollow sleeve 241. A flange is provided at the periphery of the upper part of the annular hollow sleeve 241. The lower part of the flange of the annular hollow sleeve is installed on a columnar support frame 242. A filtering bag 243 is sleeved at the periphery of the columnar support frame 242. The shape of the filtering bag 243 is supported by the columnar support frame 242 to maintain a larger filtering surface. The filtering bag 243 is inserted into the through holes on the partition plate 23. The filtering device is used, so as to improve the filtering effect and facilitate the inspection and replacement.

The annular hollow sleeve 241 is made of sealing rubber. Rubber is used to ensure the sealing effect. The air storage device comprises an air storage tank 19. The air storage tank 19 is communicated with a compressor 14 through a pipeline. The air storage tank 19 is connected with the first valve 17 and the second valve 18. Compressed air can be stored in the air storage tank in advance. Blowback can be performed quickly during cleaning, which saves time and increases working efficiency.

The first valve 17, the second valve 18 and the third valve 131 are electromagnetic valves, and the fourth valve 12 is an electric butterfly valve. The first valve 17, the second valve 18, the third valve 131, the fourth valve 12, the compressor and the main fan are connected with a PLC control device. The installation of electric valves is easy to realize full-automatic control.

The end of the main fan air outlet is communicated with a muffler 20. The purpose of using a muffler is to reduce noise.

The base 1 and the bottom of the dust collecting barrel 30 are provided with moving wheels, which can be pushed and pulled for use, facilitate dumping dust and facilitate transportation and movement.

Working principle of dust collection: the PLC controls the main fan 21 to be electrified and started and the third valve 131 to be electrified and turned on. The fourth valve 12 and the fifth valve are in the OFF state, and the sixth valve 34 is in the ON state. The dust in the auxiliary filtering barrel 33 can fall. The dust enters the cavity of the filtering barrel 9 below the partition plate 23 through the air suction port 13, and then is filtered by the filtering device 24. The dust temporarily stays in the filtering barrel 9. Fresh air passes through the annular hollow sleeve 241, and then enters the cavity of the filtering barrel 9 above the partition plate 23. The fresh air enters the main fan air inlet 22 through the cavity of the filtering barrel 9 above the partition plate 23, and then enters the main fan 21, and is discharged to the muffler 20 through the main fan air outlet.

When the dust collecting bag 304 is full, it is necessary to replace the dust collecting bag 304, and the dust collecting barrel 30 connected to the filtering barrel 9 is pulled out to replace the dust collecting bag 304. After the replacement, the dust collecting bag can be reinstalled by reverse operation.

Working principle of blowback: in a first process, the PLC controls the compressor 14 to be electrified, and at the same time turns off the third valve 131 and turns on the fifth valve. The auxiliary fan 36 operates. The sixth valve 34 is in the OFF state, the fourth valve 12 is turned on, and the first valve 17 is turned on. The air in the air storage tank 19 is blown to the lower part of the partition plate 23 through the second blowback pipe 26, and it is forwardly blown to the periphery of the filtering bag 243. The dust on the periphery of the filtering bag 243 is blown down to the dust collecting bag 304.

In a second process, the PLC controls the compressor 14 to be electrified, and at the same time turns off the third valve 131 and turns on the fifth valve. The auxiliary fan 36 operates. The sixth valve 34 is in the OFF state, the fourth valve 12 is turned on, and the second valve 18 is turned on. The air in the air storage tank 19 is blown into the filtering bag through the first blowback pipe 25.

During the above blowback cleaning, the auxiliary fan 36 takes over the work of the main fan 21, which does not affect the dust collection. When the blowback is completed and the main fan 21 works, the sixth valve 34 is turned on, and the dust falls in the auxiliary filtering barrel 33.

The first valve 17 and the second valve 18 are electromagnetic valves.

The two processes are alternately carried out in the set time. In order to prevent the pressure of the filtering barrel 9 from being too high during blowback and forward blowing, a blowback exhaust pipe 28 is provided at one side of the filtering barrel 9. When the pressure is too high, the air is filtered into fresh air through the filtering device 24 in the blowback exhaust pipe 28, and is discharged through the one-way valve 28. When collecting dust, the one-way valve 28 is in the OFF state due to the negative pressure in the lower cavity of the partition plate 23.

Principle of quick disassembly and assembly of the dust collecting barrel 30: as shown in FIGS. 8-11, during installation, first, the rotating shaft 302 is pushed into the L-shaped groove 291. At this time, the roller 303 is pressed against the upper surface of the bump 292, and then the handle 301 is pressed downward. At this time, the rotating shaft 302 will move up to the top of the L-shaped groove 291 under the action of a lever (the roller 303 is equivalent to a fulcrum), driving the dust collecting barrel 30 to move up. The edge of the mouth of the dust collecting barrel 30 is closely attached to the groove 121. Finally, the handle 301 is continuously pressed downward. The roller 303 moves to the inside of the bump 292, and the position of the dust collecting barrel 30 is fixed by the gravity of the dust collecting barrel 30. Reverse operation is performed when disassembling.

The above is only the preferred embodiment of the present disclosure, but the protection scope of the present disclosure is not limited thereto. Any equivalent substitution or change made by those skilled in the art according to the technical scheme of the present disclosure and the inventive concept within the technical scope disclosed by the present disclosure should be included in the protection scope of the present disclosure.

What is claimed is:

1. A dust collector, comprising a base, wherein a filtering barrel is installed on the upper part of the base, one side of the filtering barrel is provided with a main fan, the main fan is provided with a main fan air inlet and a main fan air outlet, the main fan air inlet extends to the inside of the filtering barrel through the outer wall of the filtering barrel, the upper section of the filtering barrel is provided with a partition plate capable of dividing the inner space of the filtering barrel, the inner space of the filtering barrel above the divided partition plate is an upper cavity of the filtering barrel, the inner space of the filtering barrel below the divided partition plate is the lower cavity of the filtering barrel, the partition plate is provided with a plurality of through holes, the main fan air inlet is communicated with one of the through holes hermetically, filtering bags are installed in other through holes hermetically, a straight pipe which extends to the outside of the filtering barrel is installed on the upper part of the partition plate, the surface of the straight pipe is provided with a plurality of first blowback pipes communicated with the straight pipe, each of the first blowback pipes faces a filtering bag, a bent pipe extending to the outside of the filtering barrel is provided above or below the straight pipe, the surface of the bent pipe is provided with a plurality of second blowback pipes communicated with the bent pipe, the second blowback pipes extend to the lower part of the partition plate through the partition plate, the upper part of the partition plate is hermetically isolated from the outside by a sealing plate, the bent pipe is communicated with an air storage tank through a first valve, the straight pipe is communicated with the air storage tank through a second valve, one side of the filtering barrel is provided with an air suction port leading to the lower cavity of the filtering barrel, the end of the air suction port is provided with a third valve, the lower cavity of the filtering barrel is hermetically isolated from the outside through a fourth valve provided at the bottom of the filtering barrel, the air suction port is communicated with an auxiliary air suction pipe, a fifth valve is installed in the auxiliary air suction pipe, the fifth valve is communicated with the inside of an auxiliary filtering barrel, the auxiliary filtering barrel is communicated with an auxiliary air outlet pipe outside the auxiliary filtering barrel through a filtering bag inside the auxiliary filtering barrel, the auxiliary air outlet pipe is communicated with an auxiliary fan, and the bottom of the auxiliary filtering barrel is provided with a sixth valve.

2. The dust collector according to claim 1, wherein the other side of the filtering barrel is provided with a blowback exhaust pipe communicated with the lower cavity of the filtering barrel, the inside of the blowback exhaust pipe is communicated with the outside through the filtering bag, and the top of the blowback exhaust pipe is provided with a one-way valve.

3. The dust collector according to claim 1, wherein two vertical racks are provided on the upper part of the base, rotating shafts are provided on the two racks oppositely, the rotating shafts are provided with a support frame rotating around the rotating shafts, the support frame is used to fixedly install the filtering barrel, the main fan is installed on the support frame, when the filtering barrel stands upright, the surface of the rack on the radial side of the rotating shaft is provided with a first pin hole, the surface of the support frame on the radial side of the rotating shaft is provided with a second pin hole, the position of the first pin hole is opposite to that of the second pin hole, the surface of the rack on the axial side of the rotating shaft is provided with a third pin hole, the surface of the support frame is provided with a fourth pin hole, and the position of the third pin hole corresponds to that of the fourth pin hole.

4. The dust collector according to claim 3, wherein one end of a hydraulic rod is installed on the surface of the support frame on the radial side of the rotating shaft through a hinge, and the other end of the hydraulic rod is installed on the surface of the base through a hinge.

5. The dust collector according to claim 1, wherein the outlet of the fourth valve is provided vertically downward, the fourth valve is provided with a circle of grooves with downward openings around the outlet, the lower part of the filtering barrel is provided with a dust collecting barrel with upward openings, the upper edge of the dust collecting barrel is installed in the grooves, two dust collecting barrel brackets are vertically provided on the rack of the lower part of the fourth valve, and the dust collecting barrel is provided between the two dust collecting barrel brackets;

the inner side of the dust collecting barrel bracket is provided with an L-shaped groove, the L-shaped groove is open to the direction opposite to the rack, the surface of the dust collecting barrel bracket on the lower part of the L-shaped groove is provided with a bump, rotating shafts are provided on both sides of the dust collecting barrel, a handle perpendicular to the axis of the rotating shaft is fixedly provided on the rotating shaft, and a roller parallel to the axis of the rotating shaft extends from the side surface of the handle.

6. The dust collector according to claim 1, wherein the sealing plate and the filtering barrel are fixed by a buckle, and the sealing plate and the filtering barrel are sealed by a sealing gasket provided at the top edge of the filtering barrel.

7. The dust collector according to claim 1, wherein the filtering bag comprises an annular hollow sleeve, a flange is provided at the periphery of the upper part of the annular hollow sleeve, the lower part of the flange of the annular hollow sleeve is installed on a columnar support frame, a filtering bag is sleeved at the periphery of the columnar support frame, the filtering bag is inserted into the through holes on the partition plate, and the annular hollow sleeve is made of sealing rubber.

8. The dust collector according to claim 1, wherein the air storage tank comprises an air storage tank, the air storage tank is communicated with a compressor through a pipeline, and the air storage tank is connected with the first valve and the second valve.

9. The dust collector according to claim 1, wherein the first valve, the second valve, the third valve, the fourth valve, the fifth valve and the sixth valve are electric valves.

10. The dust collector according to claim 1, wherein the end of the main fan air outlet is communicated with a muffler.

* * * * *